United States Patent
Sahota et al.

(10) Patent No.: US 10,528,951 B2
(45) Date of Patent: Jan. 7, 2020

(54) PAYMENT SERVICE AUTHENTICATION FOR A TRANSACTION USING A GENERATED DYNAMIC VERIFICATION VALUE

(71) Applicant: Visa International Service Association, Foster City, CA (US)

(72) Inventors: Jagdeep Singh Sahota, Rodeo, CA (US); Christian Aabye, Morgan Hill, CA (US)

(73) Assignee: Visa International Service Association, San Francisco, CA (US)

(*) Notice: Subject to any disclaimer, the term of this patent is extended or adjusted under 35 U.S.C. 154(b) by 324 days.

(21) Appl. No.: 13/828,504

(22) Filed: Mar. 14, 2013

(65) Prior Publication Data
US 2013/0204794 A1    Aug. 8, 2013

Related U.S. Application Data

(60) Continuation of application No. 12/819,811, filed on Jun. 21, 2010, now Pat. No. 8,423,415, which is a
(Continued)

(51) Int. Cl.
*G06Q 20/40* (2012.01)
*G06Q 20/10* (2012.01)
(Continued)

(52) U.S. Cl.
CPC ......... *G06Q 20/4018* (2013.01); *G06Q 20/10* (2013.01); *G06Q 20/20* (2013.01);
(Continued)

(58) Field of Classification Search
CPC .. G06Q 20/401; G06Q 20/412; G06Q 20/409; G06Q 20/425; G06Q 20/40975;
(Continued)

(56) References Cited

U.S. PATENT DOCUMENTS 3,956,615 A  5/1976 Anderson et al.
4,186,871 A  2/1980 Anderson et al.
(Continued)

FOREIGN PATENT DOCUMENTS

JP  2000-078128    3/2000
JP  2000-298733 A  10/2000
(Continued)

OTHER PUBLICATIONS

International Search Report from PCT/US04/26813, dated May 7, 2007.
(Continued)

*Primary Examiner* — Arunava Chakravarti
(74) *Attorney, Agent, or Firm* — Kilpatrick Townsend & Stockton LLP

(57) ABSTRACT

Methods and systems for dynamically generating a verification value for a transaction and for utilizing such value to verify the authenticity of the payment service application. The dynamically created verification value may be generated on a payment device, such as an integrated circuit credit card or smart card, embedded into the payment data, and transmitted to a point of sale terminal. Alternatively, payment data is sent by a payment device to a point of sale terminal, which generates a verification value and embeds it into the payment data. The embedded verification value is used by a service provider to verify the authenticity of the transaction. The methods and systems may be used in a contactless (wireless) environment or a non-wireless environment.

14 Claims, 7 Drawing Sheets

Related U.S. Application Data division of application No. 10/642,878, filed on Aug. 18, 2003, now Pat. No. 7,761,374.

(51) Int. Cl.
*G06Q 20/20* (2012.01)
*G06Q 20/34* (2012.01)
*G06Q 20/38* (2012.01)
*G07F 7/10* (2006.01)

(52) U.S. Cl.
CPC ......... *G06Q 20/341* (2013.01); *G06Q 20/388* (2013.01); *G06Q 20/401* (2013.01); *G06Q 20/4093* (2013.01); *G07F 7/1008* (2013.01)

(58) Field of Classification Search
CPC .......... G06Q 20/3823; G06C 20/40975; G06C 20/3823
USPC ......................................................... 705/16
See application file for complete search history.

(56) References Cited

U.S. PATENT DOCUMENTS

| | | | |
|---|---|---|---|
| 4,238,853 A | 12/1980 | Ehrsam et al. | |
| 4,277,837 A | 7/1981 | Stuckert | |
| 4,317,957 A | 3/1982 | Sendrow | |
| 4,423,287 A | 12/1983 | Zeidler | |
| 4,528,442 A | 7/1985 | Endo | |
| 5,254,843 A | 10/1993 | Hynes et al. | |
| 5,311,594 A | 5/1994 | Penzias | |
| 5,434,398 A | 7/1995 | Goldberg | |
| 5,465,387 A | 11/1995 | Mukherjee | |
| 5,513,250 A | 4/1996 | McAllister | |
| 5,530,438 A | 6/1996 | Bickham et al. | |
| 5,577,121 A | 11/1996 | Davis et al. | |
| 5,615,110 A | 3/1997 | Wong | |
| 5,625,689 A | 4/1997 | Indeck et al. | |
| 5,627,355 A | 5/1997 | Rahman et al. | |
| 5,679,940 A | 10/1997 | Templeton et al. | |
| 5,708,422 A | 1/1998 | Blonder et al. | |
| 5,721,781 A | 2/1998 | Deo et al. | |
| 5,737,421 A | 4/1998 | Audebert | |
| 5,740,244 A | 4/1998 | Indeck et al. | |
| 5,745,576 A | 4/1998 | Abraham et al. | |
| 5,774,525 A | 6/1998 | Kanevsky et al. | |
| 5,802,176 A | 9/1998 | Audebert | |
| 5,819,226 A | 10/1998 | Gopinathan et al. | |
| 5,832,458 A | 11/1998 | Jones | |
| 5,834,747 A | 11/1998 | Cooper | |
| 5,835,599 A | 11/1998 | Buer | |
| 5,839,119 A | 11/1998 | Krsul et al. | |
| 5,872,834 A | 2/1999 | Teitelbaum | |
| 5,878,337 A | 3/1999 | Joao et al. | |
| 5,883,810 A | 3/1999 | Franklin | |
| 5,903,830 A | 5/1999 | Joao et al. | |
| 5,914,471 A | 6/1999 | Van De Pavert | |
| 5,914,472 A | 6/1999 | Foladare et al. | |
| 5,920,628 A | 7/1999 | Indeck et al. | |
| 5,956,699 A | 9/1999 | Wong et al. | |
| 5,988,497 A | 11/1999 | Wallace | |
| 6,000,832 A | 12/1999 | Franklin et al. | |
| 6,005,942 A | 12/1999 | Chan et al. | |
| 6,012,144 A | 1/2000 | Pickett | |
| 6,016,476 A | 1/2000 | Maes et al. | |
| 6,029,154 A | 2/2000 | Pettitt | |
| 6,055,505 A | 4/2000 | Elston | |
| 6,064,990 A | 5/2000 | Goldsmith | |
| 6,081,792 A | 6/2000 | Cucinotta et al. | |
| 6,095,413 A | 8/2000 | Tetro et al. | |
| 6,112,191 A | 8/2000 | Burke | |
| 6,122,624 A | 9/2000 | Tetro et al. | |
| 6,157,707 A | 12/2000 | Baulier et al. | |
| 6,219,793 B1 | 4/2001 | Li et al. | |
| 6,234,901 B1 | 5/2001 | Nagoshi et al. | |
| 6,260,146 B1 | 7/2001 | Mos et al. | |
| 6,263,447 B1 | 7/2001 | French et al. | |
| 6,282,656 B1 | 8/2001 | Wang | |
| 6,298,336 B1 | 10/2001 | Davis et al. | |
| 6,308,890 B1 | 10/2001 | Cooper | |
| 6,330,550 B1 | 12/2001 | Brisebois et al. | |
| 6,345,101 B1 * | 2/2002 | Shukla | 380/210 |
| 6,367,011 B1 | 4/2002 | Lee et al. | |
| 6,442,532 B1 | 8/2002 | Kawan | |
| 6,488,206 B1 | 12/2002 | Flaig et al. | |
| 6,496,936 B1 | 12/2002 | French et al. | |
| 6,505,046 B1 | 1/2003 | Baker | |
| 6,523,745 B1 | 2/2003 | Tamori | |
| 6,529,725 B1 | 3/2003 | Joao et al. | |
| 6,535,855 B1 | 3/2003 | Cahill et al. | |
| 6,592,044 B1 | 7/2003 | Wong et al. | |
| 6,607,136 B1 | 8/2003 | Atsmon et al. | |
| 6,612,488 B2 | 9/2003 | Suzuki | |
| 6,647,269 B2 | 11/2003 | Hendrey et al. | |
| 6,714,918 B2 | 3/2004 | Hillmer et al. | |
| 6,715,672 B1 | 4/2004 | Tetro et al. | |
| RE38,572 E | 8/2004 | Tetro et al. | |
| 6,775,539 B2 | 8/2004 | Deshpande | |
| 6,830,183 B2 | 12/2004 | von Mueller et al. | |
| 6,832,721 B2 | 12/2004 | Fujii | |
| 6,837,425 B2 | 1/2005 | Gauthier et al. | |
| 6,839,840 B1 | 1/2005 | Cooreman | |
| 6,839,845 B2 | 1/2005 | Hsu et al. | |
| 6,857,073 B2 | 2/2005 | French et al. | |
| 6,862,575 B1 | 3/2005 | Anttila et al. | |
| 6,868,391 B1 | 3/2005 | Hultgren | |
| 6,877,661 B2 | 4/2005 | Webb et al. | |
| 6,899,269 B1 | 5/2005 | Deland | |
| 6,904,526 B1 | 6/2005 | Hongwei | |
| 6,913,194 B2 | 7/2005 | Suzuki | |
| 6,944,782 B2 | 9/2005 | von Mueller et al. | |
| 6,948,656 B2 | 9/2005 | Williams | |
| 6,968,180 B2 | 11/2005 | Kirby et al. | |
| 6,983,882 B2 | 1/2006 | Cassone | |
| 7,003,495 B1 | 2/2006 | Burger et al. | |
| 7,003,497 B2 | 2/2006 | Maes | |
| 7,007,840 B2 | 3/2006 | Davis | |
| 7,013,293 B1 | 3/2006 | Kipnis et al. | |
| 7,024,396 B2 | 4/2006 | Woodward | |
| 7,044,394 B2 | 5/2006 | Brown | |
| 7,051,002 B2 | 5/2006 | Keresman, III et al. | |
| 7,058,611 B2 | 6/2006 | Kranzley et al. | |
| 7,058,978 B2 | 6/2006 | Feuerstein et al. | |
| 7,096,003 B2 | 8/2006 | Joao et al. | |
| 7,107,250 B2 | 9/2006 | Harrison | |
| 7,143,095 B2 | 11/2006 | Barrett et al. | |
| 7,152,788 B2 | 12/2006 | Williams | |
| 7,225,156 B2 | 5/2007 | Fisher et al. | |
| 7,243,853 B1 | 7/2007 | Levy et al. | |
| 7,251,624 B1 | 7/2007 | Lee et al. | |
| 7,257,545 B1 | 8/2007 | Hung | |
| 7,264,154 B2 | 9/2007 | Harris | |
| 7,343,317 B2 | 3/2008 | Jokinen et al. | |
| 7,349,668 B2 | 3/2008 | Ilan et al. | |
| D568,388 S | 5/2008 | Hammad | |
| D568,389 S | 5/2008 | Hammad | |
| D568,390 S | 5/2008 | Hammad | |
| 7,403,908 B1 | 7/2008 | Jaramillo | |
| 7,420,474 B1 | 9/2008 | Elks et al. | |
| 7,761,374 B2 | 7/2010 | Sahota et al. | |
| 7,899,753 B1 | 3/2011 | Everhart | |
| 2001/0005840 A1 * | 6/2001 | Verkama | 705/67 |
| 2001/0037453 A1 | 11/2001 | Mitty et al. | |
| 2002/0002681 A1 | 1/2002 | Kawano et al. | |
| 2002/0007320 A1 * | 1/2002 | Hogan et al. | 705/26 |
| 2002/0032661 A1 | 3/2002 | Schuba et al. | |
| 2002/0035548 A1 | 3/2002 | Hogan et al. | |
| 2002/0038287 A1 | 3/2002 | Villaret et al. | |
| 2002/0046189 A1 | 4/2002 | Morita et al. | |
| 2002/0049818 A1 | 4/2002 | Gilhuly et al. | |
| 2002/0091562 A1 | 7/2002 | Siegel et al. | |
| 2002/0091945 A1 | 7/2002 | Ross | |
| 2002/0095388 A1 | 7/2002 | Yu et al. | |
| 2002/0095389 A1 | 7/2002 | Gaines | |

(56) References Cited

U.S. PATENT DOCUMENTS

| | | |
|---|---|---|
| 2002/0096570 A1 | 7/2002 | Wong et al. |
| 2002/0099665 A1 | 7/2002 | Burger et al. |
| 2002/0108062 A1 | 8/2002 | Nakajima et al. |
| 2002/0116341 A1 | 8/2002 | Hogan et al. |
| 2002/0120584 A1* | 8/2002 | Hogan et al. .............. 705/67 |
| 2002/0123972 A1 | 9/2002 | Hodgson et al. |
| 2002/0133462 A1 | 9/2002 | Shteyn |
| 2002/0147658 A1 | 10/2002 | Kwan |
| 2002/0153424 A1 | 10/2002 | Li |
| 2002/0158747 A1 | 10/2002 | McGregor et al. |
| 2002/0180584 A1 | 12/2002 | McGregor et al. |
| 2002/0194499 A1 | 12/2002 | Audebert et al. |
| 2003/0061168 A1 | 3/2003 | Routhenstein |
| 2003/0074317 A1 | 4/2003 | Hofi |
| 2003/0097344 A1* | 5/2003 | Chaum et al. .............. 705/75 |
| 2003/0105964 A1 | 6/2003 | Brainard et al. |
| 2003/0115142 A1 | 6/2003 | Brickell et al. |
| 2003/0135463 A1 | 7/2003 | Brown et al. |
| 2003/0169881 A1 | 9/2003 | Niedermeyer |
| 2003/0200184 A1 | 10/2003 | Dominguez et al. |
| 2003/0208684 A1 | 11/2003 | Camacho et al. |
| 2003/0225703 A1 | 12/2003 | Angel |
| 2004/0015435 A1* | 1/2004 | Solomon et al. ............. 705/39 |
| 2004/0019970 A1 | 2/2004 | Landry |
| 2004/0024638 A1 | 2/2004 | Restis |
| 2004/0031856 A1 | 2/2004 | Atsmon et al. |
| 2004/0059688 A1 | 3/2004 | Dominguez et al. |
| 2004/0064403 A1 | 4/2004 | Hasumi et al. |
| 2004/0078340 A1 | 4/2004 | Evans |
| 2004/0107170 A1 | 6/2004 | Labrou et al. |
| 2004/0156537 A1 | 8/2004 | Chung et al. |
| 2004/0171406 A1 | 9/2004 | Purk |
| 2004/0185830 A1 | 9/2004 | Joao et al. |
| 2005/0043997 A1 | 2/2005 | Sahota et al. |
| 2005/0060233 A1 | 3/2005 | Bonalle et al. |
| 2005/0060730 A1 | 3/2005 | Soeda et al. |
| 2005/0065876 A1 | 3/2005 | Kumar |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0080730 A1 | 4/2005 | Sorrentino |
| 2005/0091152 A1 | 4/2005 | Suisa |
| 2005/0097320 A1 | 5/2005 | Golan et al. |
| 2005/0119978 A1* | 6/2005 | Ates .............................. 705/67 |
| 2005/0122209 A1 | 6/2005 | Black |
| 2005/0149455 A1 | 7/2005 | Bruesewitz et al. |
| 2005/0170814 A1 | 8/2005 | Joao et al. |
| 2005/0171905 A1 | 8/2005 | Wankmueller et al. |
| 2005/0218229 A1 | 10/2005 | Morley et al. |
| 2005/0228986 A1 | 10/2005 | Fukasawa et al. |
| 2005/0268107 A1 | 12/2005 | Harris et al. |
| 2005/0273442 A1 | 12/2005 | Bennett et al. |
| 2006/0018523 A1 | 1/2006 | Saitoh et al. |
| 2006/0059110 A1 | 3/2006 | Madhok et al. |
| 2006/0136546 A1 | 6/2006 | Trioano et al. |
| 2006/0165060 A1 | 7/2006 | Dua |
| 2006/0202025 A1 | 9/2006 | Calabrese et al. |
| 2006/0219776 A1 | 10/2006 | Finn |
| 2006/0281439 A1 | 12/2006 | Benco et al. |
| 2006/0282382 A1 | 12/2006 | Balasubramanian et al. |
| 2006/0287955 A1 | 12/2006 | Moulart et al. |
| 2006/0290501 A1 | 12/2006 | Hammad et al. |
| 2006/0293027 A1 | 12/2006 | Hammad et al. |
| 2007/0017970 A1 | 1/2007 | Gauthier et al. |
| 2007/0034679 A1 | 2/2007 | Gauthier et al. |
| 2007/0055630 A1 | 3/2007 | Gauthier et al. |
| 2007/0057034 A1 | 3/2007 | Patrick et al. |
| 2007/0136131 A1 | 6/2007 | Mankoff |
| 2007/0143227 A1* | 6/2007 | Kranzley et al. ............. 705/67 |
| 2007/0250380 A1 | 10/2007 | Mankoff |
| 2007/0260544 A1 | 11/2007 | Wankmueller et al. |
| 2007/0288641 A1 | 12/2007 | Lee et al. |
| 2007/0294182 A1 | 12/2007 | Hammad |
| 2008/0004121 A1 | 1/2008 | Gatto et al. |
| 2008/0005037 A1 | 1/2008 | Hammad et al. |
| 2008/0029593 A1 | 2/2008 | Hammad et al. |
| 2008/0034221 A1 | 2/2008 | Hammad et al. |
| 2008/0040271 A1 | 2/2008 | Hammad et al. |
| 2008/0040276 A1 | 2/2008 | Hammad et al. |
| 2008/0065553 A1 | 3/2008 | Faith et al. |
| 2008/0103982 A1 | 5/2008 | Hammad et al. |
| 2008/0116264 A1 | 5/2008 | Hammad et al. |
| 2008/0120214 A1 | 5/2008 | Steele et al. |
| 2008/0120236 A1 | 5/2008 | Faith et al. |
| 2008/0128513 A1 | 6/2008 | Hammad et al. |
| 2008/0163257 A1 | 7/2008 | Carlson et al. |
| 2008/0183480 A1 | 7/2008 | Carlson et al. |
| 2008/0201212 A1 | 8/2008 | Hammad et al. |
| 2008/0203151 A1 | 8/2008 | Dixon et al. |
| 2008/0203152 A1 | 8/2008 | Hammad et al. |
| 2008/0203170 A1 | 8/2008 | Hammad et al. |
| 2008/0208681 A1 | 8/2008 | Hammad et al. |
| 2008/0302876 A1 | 12/2008 | Mullen |
| 2008/0303632 A1 | 12/2008 | Hammad |
| 2009/0055892 A1 | 2/2009 | Lu et al. |
| 2009/0055893 A1 | 2/2009 | Manessis et al. |
| 2009/0171682 A1 | 7/2009 | Dixon et al. |
| 2009/0202081 A1 | 8/2009 | Hammad et al. |
| 2010/0262546 A1 | 10/2010 | Sahota et al. |
| 2011/0231315 A1 | 9/2011 | Bandyopadhyay et al. |

FOREIGN PATENT DOCUMENTS

| | | |
|---|---|---|
| JP | 2007-517272 A | 6/2007 |
| WO | 00/025262 A1 | 5/2000 |
| WO | 2002 41565 A1 | 5/2002 |
| WO | 03/081832 A2 | 10/2003 |
| WO | 2005/001635 A2 | 1/2005 |

OTHER PUBLICATIONS

Written Opinion of the International Searching Authority from PCT/US04/26813, dated May 7, 2007.

International Preliminary Report on Patentability from PCT/US04/26813, dated May 30, 2007.

Decision to Grant from JP 2006-524010 dated Mar. 29, 2011 (English translation only).

Office Action, dated Jan. 11, 2008, U.S. Appl. No. 10/642,878.

Final Office Action, dated Oct. 3, 2008, U.S. Appl. No. 10/642,878.

Office Action, dated Jun. 10, 2009, U.S. Appl. No. 10/642,878.

Office Action, dated Mar. 13, 2012, U.S. Appl. No. 12/819,811.

Fujitsu Microelectronics America Announces New Fingerprint Identification Technology for Cell Phones, Mobile Devices Mar. 11, 2002 by Fujitsu Microelectronics America, Inc at www.fujitsu.com/us/news/pr/fma_20020311.html.

Extended European Search Report, dated Oct. 30, 2017, in EP Application No. 17177949.9, 8 pages.

* cited by examiner

PAYMENT SERVICE AUTHENTICATION FOR A TRANSACTION USING A GENERATED DYNAMIC VERIFICATION VALUE

CROSS-REFERENCES TO RELATED APPLICATIONS

This application is a continuation of U.S. application Ser. No. 12/819,811, filed Jun. 21, 2010, which is a divisional of U.S. application Ser. No. 10/642,878, filed Aug. 18, 2003, the contents of which are hereby incorporated by reference in their entireties for all purposes.

BACKGROUND

As methods and devices for engaging in financial transactions have increased and expanded into new horizons, age old problems such as fraud and counterfeiting persist. In fact, as applications and devices are developed which make credit or debit based transactions a more attractive and readily available alternative to cash, fraud and counterfeiting activities have seen a proportionate increase.

In order to protect financial institutions, consumers and merchants from the fraudulent use of transaction cards, the industry has developed and introduced many features designed to reduce fraud and counterfeiting such as holograms, special over-layers, and watermarks. Nonetheless, many of these features are proving to be less effective as financial transactions are increasingly being conducted in a wireless environment. Similarly, as financial instruments are increasingly being employed on electronic devices, rather than physical plastic cards, the ability to use techniques such as a customer signature or holograms to verify a party to a transaction is becoming less available.

One of the primary sources of fraud, which is prevalent in the credit card industry is skimming, which refers to the electronic copying of the card's magnetic stripe data to create counterfeit cards. Early skimming was difficult to hide and required cumbersome equipment. As credit card technology has become more sophisticated, so has the technology used by skimmers.

In addition, new forms of skimming have appeared. For example, in one instance a small bug was implanted in a terminal, and left in place for weeks to collect hundreds of card numbers before being removed to harvest the collective card data. Also, one of the more insidious forms of skimming involved line tapping wherein the communication lines between the terminal and the credit card issuer is tapped and the card data extracted from the communications string. One of the most sophisticated examples of line tapping involved skimmers renting an office next to an issuers regional data center and tapping lines going to the issuer computers. The tapped lines were redirected through a computer on the skimmer's site. Compounding the problem, the skimmers were able to remotely access their computer thus permitting the skimmers to harvest the credit card numbers from a remote location. By some estimates, skimming costs financial institutions hundreds of billions of dollars annually. Furthermore, some industry analysts have estimated that each skimmed card will engage in at least $2,000 in transactions before the fraud is uncovered.

Skimming is predominantly a phenomenon afflicting magnetic stripe based transactions. This is because the magnetic stripe, which is placed on the back of a transaction card and stores a variety of data on three separate tracks, is a passive media. In other words, the digital content of the magnetic stripe can be perfectly copied, without any difference between the copy and the original. Largely, this feature is relied upon in legitimate magnetic stripe transactions as a point of sale terminal is simply required to read the data present on the magnetic stripe.

One of the primary means by which skimming can be prevented is for the consumer to closely monitor the whereabouts of their transaction card. This will allow the consumer to prevent the card from being swiped through inappropriate devices. However, as magnetic stripe contactless cards evolve and bring the promise of quick transactions to current payment environments, the classic skimming problem comes along with it. In fact, in a wireless environment the opportunity to skim magnetic stripe data is more prevalent. In a wireless environment, a potential skimmer need not physically possess the card to be skimmed nor have access to any of the physical equipment (e.g. POS terminal, communication lines, etc.) which is required for skimming in a wire based environment. A skimmer can simply, and without knowledge of the consumer or merchant, intercept the wireless transaction and copy the data being transmitted from the card to POS terminal.

Nonetheless, magnetic stripe data and magnetic stripe payment applications are increasingly being deployed on integrated circuit cards or similar devices which have processing capabilities. Accordingly, what is needed is to dynamically generate a verification value for each transaction which can be used to authenticate the transaction. Such an approach to authentication of the payment service will significantly reduce the opportunity for skimming since the verification value is different for each transaction. Therefore, even if the data utilized in a given transaction is skimmed, that data will not be useful in conducting further transactions since the skimmed verification value is not valid for subsequent transactions.

BRIEF SUMMARY

The present invention describes a system and method for dynamically generating a verification value for verifying the authenticity of a payment service deployed on a payment device, such as an integrated circuit credit card, each time the payment service is utilized in a transaction. With each transaction, a verification value is dynamically generated on the payment device from data specific to the payment service. The verification value is embedded into the payment data which is transmitted from the payment device to a point of sale terminal such as a credit card terminal. The point of sale terminal transmits the payment data, with the embedded verification data, which may be in the form of magnetic stripe credit card Track 1 and/or Track 2 data, to a payment network which transmits the payment data to a service provider computer. The service provider computer independently generates a verification value. The transaction is disapproved if the service provider generated verification value does not match the payment device generated verification value.

In an alternate embodiment, payment data generated with each transaction on the payment device is transmitted from the payment device on which the payment data was generated to a point of sale terminal such as a credit card terminal. A verification value may be generated by the point of sale terminal using the payment data and information contained within the point of sale device. The point of sale terminal transmits the payment data, with the verification data, which may be in the form of magnetic stripe credit card Track 1 and/or Track 2 data, to a payment network which transmits the payment data to a service provider computer. The service provider computer independently generates a verification value. The transaction is disapproved if the service provider generated verification value does not match the verification value generated on the point of sale terminal.

The present invention may be used in any transaction in which magnetic stripe Track 1 and/or Track 2 data will be exchanged over any type of interface including contact-based interfaces and wireless interfaces.

BRIEF DESCRIPTION OF THE DRAWINGS

Aspects, features, benefits and advantages of the embodiments of the present invention will be apparent with regard to the following description, appended claims and accompanying drawings where:

DETAILED DESCRIPTION

Figure 1:
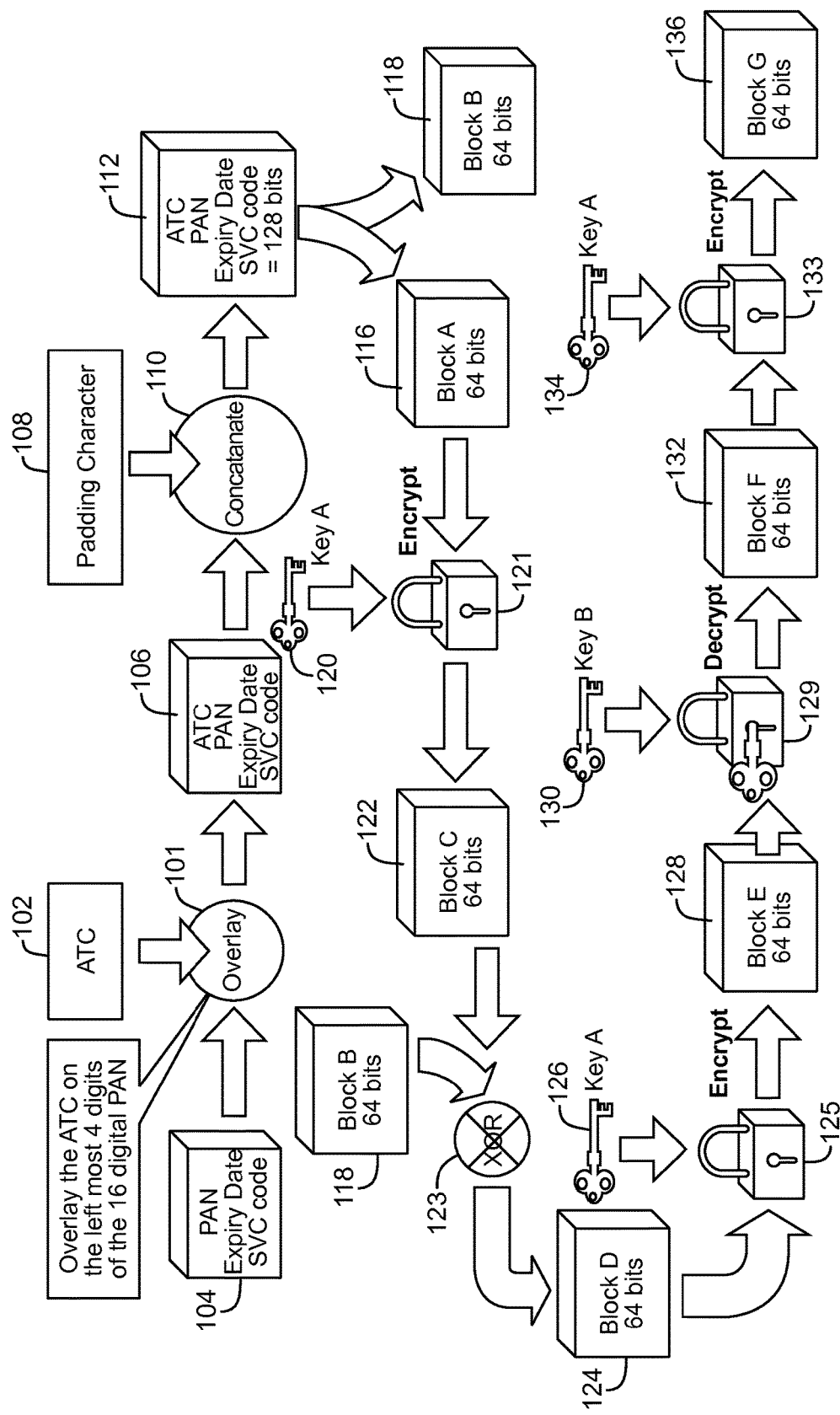
FIG. 1 depicts the method of creating an encrypted data block for use in the present invention.

Before the present methods are described, it is to be understood that this invention is not limited to the particular methodologies, devices or protocols described, as these may vary. It is also to be understood that the terminology used in the description is for the purpose of describing the particular versions or embodiments only, and is not intended to limit the scope of the present invention which will be limited only by the appended claims. In particular, although the present invention is described in conjunction with financial transactions, it will be appreciated that the present invention may find use in any electronic exchange of data.

It must also be noted that as used herein and in the appended claims, the singular forms "a", "an", and "the" include plural reference unless the context clearly dictates otherwise. Thus, for example, reference to a "key" is a reference to one or more keys and equivalents thereof known to those skilled in the art, and so forth. Unless defined otherwise, all technical and scientific terms used herein have the same meanings as commonly understood by one of ordinary skill in the art. Although any methods similar or equivalent to those described herein can be used in the practice or testing of embodiments of the present invention, the preferred methods are now described. All publications mentioned herein are incorporated by reference. Nothing herein is to be construed as an admission that the invention is not entitled to antedate such disclosure by virtue of prior invention.

Generally, the present invention provides methods and systems for dynamically generating a card verification value for each transaction and for utilizing such value to verify that the payment service is authentic and has not been skimmed.

The dynamically generated Card Verification Value (referred to herein as the "dCVV") is generated on the payment device, embedded into the payment data, and transmitted to a point of sale terminal. In an alternate embodiment, payment data is received from a payment device, a verification value is generated by a point of sale terminal, and the verification value is embedded into the payment data.

In an embodiment, data received by the point of sale terminal is interpreted as simply payment data (e.g. standard magnetic stripe Track 1 and/or Track 2 data without an embedded dCVV) by the point of sale terminal. The point of sale terminal passes on the received data to a payment network which, in turn, passes the data on to the service provider. If the service provider determines the transaction is one for which a dCVV is required, the service provider independently generates a verification value. If the verification value generated by the service provider does not match the dCVV received from the payment device, the transaction is identified as potentially fraudulent and disapproved.

In an alternate embodiment, data is received by the point of sale terminal and is used by the point of sale terminal to generate a verification value. The point of sale terminal passes on the received data to a payment network which, in turn, passes the data on to the service provider. The service provider independently generates a verification value. If the verification value generated by the service provider does not match the dCVV received from the point of sale terminal, the transaction is identified as potentially fraudulent and disapproved.

For purposes of this application, the term "payment device" shall mean any device comprising a microprocessor which may be used in a transaction or data exchange as described herein. Without limiting the generality of the foregoing, "payment device" shall include an integrated circuit card (also commonly known as a smartcard), a memory card, a cellular telephone, a personal digital assistant, a mobile electronic device, or a computer.

For purposes of this application, "contactless" or "wireless" shall mean any communications method or protocol, including proprietary protocols, in which data is exchanged between two devices without the need for the devices to be physically coupled. Without limiting the generality of the foregoing, "contactless" or "wireless" shall include data transmissions by laser, radio frequency, infrared communications, Bluetooth, or wireless local area network.

For purposes of this application, the term "payment service" shall mean any application deployed on a payment device which causes the exchange of data between the payment device and any other device or location. It should be appreciated that "payment service" is not limited to financial applications.

For purposes of this application, "payment data" shall mean, with respect to financial applications those data elements used by the payment service to execute a transaction, and with respect to non-financial transactions any necessary data elements exclusive of the present invention. For example, when the payment service is a magnetic stripe credit card transaction, "payment data" would comprise Track 1 and/or Track 2 data, as that is understood by one of ordinary skill in the credit card industry, such as the primary account number, expiration date, service codes, and discretionary data. "Payment data" may also comprise a unique card identification number or a unique identification number for a service provider.

In an embodiment, the payment data will reside on memory located on the payment device. The payment device will also maintain an application transaction counter (ATC). The ATC will initially be set by the service provider to a predetermined value. Thereafter, the ATC will be incremented with each transaction. Alternately, the ATC may be decremented from its initial predetermined value with each transaction. The ATC may be a value of any length. In addition, the service provider which deployed the payment service will maintain a corresponding ATC accessable [sic] to the service provider's computer. As discussed in more detail below, this corresponding ATC is used to identify payment services which may have been skimmed. In an alternate embodiment, a cryptogram, digital signature, or hash value based on transaction data may be used in place of or in conjunction with the ATC.

Each time the payment service is initiated, a dCVV is generated on the payment device for authentication purposes. FIG. 1 depicts the method of generating a dCVV for each transaction according to the present invention. Initially, a numeric string of predetermined length is created. This numeric string is created by overlaying 101 the ATC 102 over the corresponding left-most digits of the account number for the payment service or PAN 104. This numeric string is concatenated on the right with the expiration date for the payment service and the service code to produce a concatenated value 106. If necessary, padding characters 108 are concatenated 110 on the right of the concatenated value 106 to form a numeric string 112 with a predetermined fixed length. In a preferred embodiment, this numeric string 112 is 128-bits in length, although a numeric string of any length may be used. The padding characters 108 may consist of a stream of 0's, 1's, or any other numeric value that is known both to the payment device and the service provider. The numeric string 112 is bisected into two blocks of equal length, Block A 116 and Block B 118. Block A 116 is then encrypted 121 with a first encryption key 120. The result of the encryption step 121 is Block C 122 of length equal to Block A 116. Block C 122 is then exclusively OR'ed (XOR) 123 with Block B 118 resulting in Block D 124. Block D 124 is then encrypted 125 with a second encryption key 126 to produce Block E 128. Block E 128 is then decrypted 129 using a decryption key 130 to produce Block F 132. Block F 132 is then encrypted 133 using a fourth encryption key 134 to produce Block G 136.

It will be apparent to one of ordinary still in the art that the first encryption key 120, the second encryption key 126, the third encryption key 130 and the fourth encryption key 134 may take any preselected value. In an embodiment of the present invention, the first encryption key 120, the second encryption key 126, and the fourth encryption key 134 are equivalent and of a different value from the third encryption key 130. Other permutations of the encryption key values utilized in the methodology of FIG. 1 are within the scope of the present invention.

Figure 2:
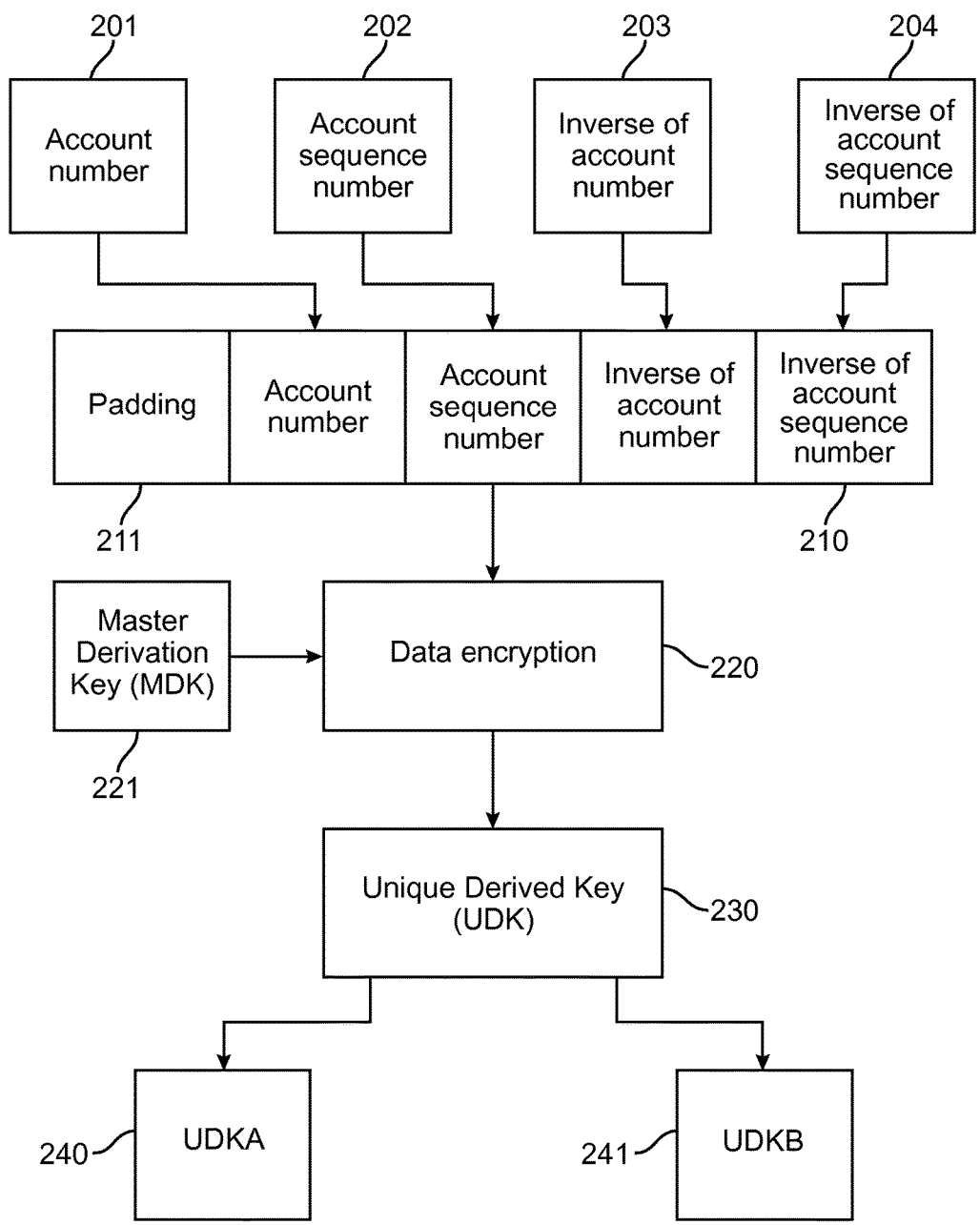
FIG. 2 depicts a method for generating unique derived keys from data residing on a payment device.

In a preferred embodiment, the first encryption key 120, the second encryption key 126, the third encryption key 130, and the fourth encryption key 134 take the value of unique keys derived from data existing on the payment device. Upon deployment, each payment service is personalized by the service provider with a master derivation key. The master derived key may be deployed with payment services in batches (i.e. multiple payment services receive the same master derived key) or individually. Each payment device will be personalized with the functionality to derive keys unique to the payment service. FIG. 2 shows the methodology for deriving two unique keys which are utilized in the preferred embodiment. The account number 201, the account sequence number 202, the inverse of the account number 203, and the inverse of the account sequence number 204 are concatenated together to create a concatenated value 210. If necessary, the concatenated value 210 may be padded with zeroes, or some other value 211, to create a string of a predetermined fixed length. In a preferred embodiment, the concatenated value 210 may be 128 bits in length, although the concatenated value is not limited to being this length. The concatenated value 210 is then encrypted 220 using the master derivation key 221 as the encryption key for each encryption stage. The encryption utilized may include any type of encryption methodology. For example, this encryption step may utilize Triple-DES encryption. The value resulting from the encryption step 220 is a unique derived key or UDK 230 for the application identified by the account number. Two additional keys, UDKA 240 and UDKB 241, are derived from the UDK. The derivation of UDKA 240 and UDKB 241 from the UDK 230 may take any form, including assigning the value of the leftmost half of the UDK 230 to UDKA 240, and assigning the value of the rightmost half of the UDK 230 to UDKB 241. Alternatively, the UDKA 240 may be derived by selecting alternating or other predetermined bit sequences from the UDK 230 while the remaining bits are assigned to UDKB 241. Furthermore, there is no requirement that UDKA 240 and UDKB 241 are of equal length.

Figure 3:
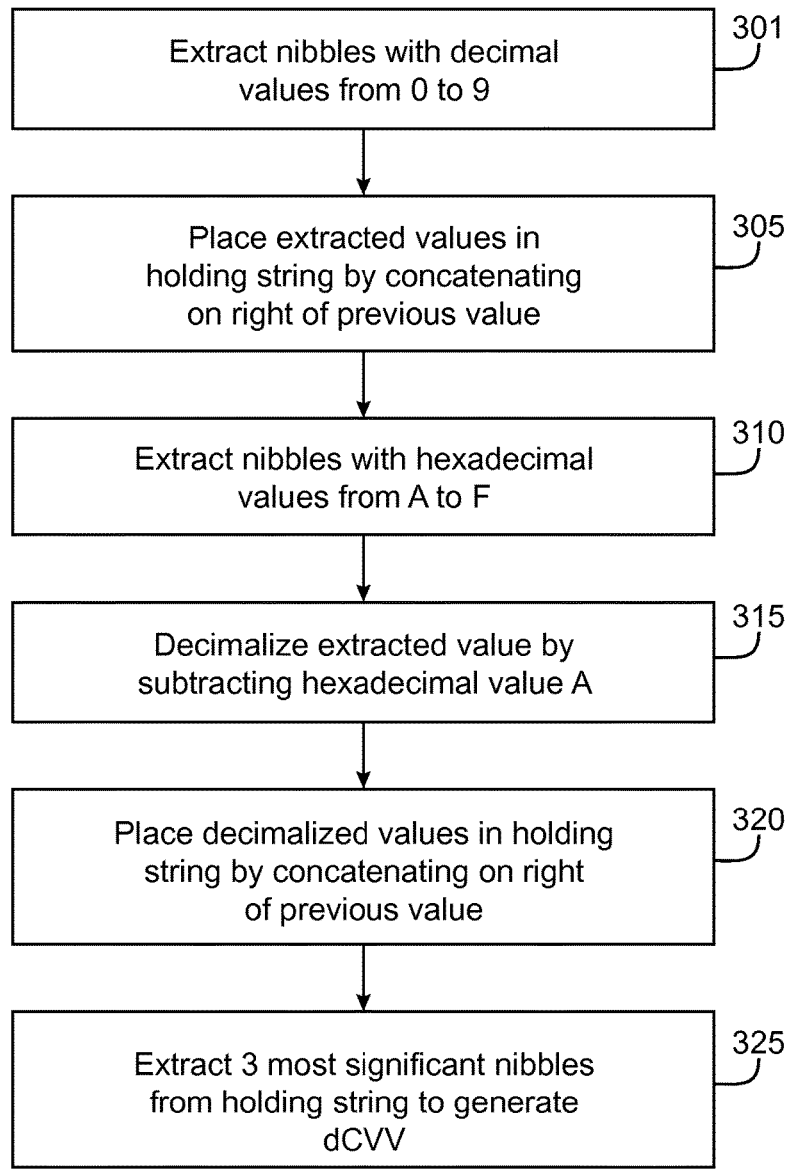
FIG. 3 depicts a method for extracting portions of an encrypted data block for creating a dynamic card verification value according to the present invention.

Returning now to the result of the methodology set forth in FIG. 1. FIG. 3 describes the further processing required to generate the dCVV. Each nibble (4-bit grouping) of the value stored in Block G 136 is subjected to two separate iterative processes to evaluate the value of each nibble. As shown in FIG. 3, beginning with the most significant (i.e left most) digit of Block G 136 and examining each sequential nibble, if a nibble contains a value ranging from zero to nine, inclusive, that value is extracted 301 and placed in a new numeric string 305, referred to herein as a holding string, by concatenating the extracted value to the right of the previously extracted value, if any. The result will be that the holding string contains a series of values ranging from zero to nine, inclusive, which appear from left to right in the holding string in the same sequence in which they appear in Block G 136.

A second evaluation is then performed again beginning with the most significant digit of Block G 136 and examining each sequential nibble. If a nibble contains a hexadecimal value ranging from ten (A) to fifteen (F), inclusive, that value is extracted 310. The extracted value is then decimalized by subtracting the hexadecimal value A from the extracted value resulting in a decimalized value ranging from zero to five 315. This decimalized value is then concatenated on the right to the right most value of the holding string 320.

Once all nibbles in Block G have been twice examined as described, the three most-significant (i.e. leftmost) nibbles of the holding string are extracted 325. This 3-digit value is the dCVV for the transaction. Other numbers of bits may be extracted from the twice-examined nibble string to generate the dCVV for a transaction. Furthermore, different nibbles, such as the rightmost nibbles, may be used as the dCVV for a transaction. The three leftmost nibbles, however, represent a preferred embodiment.

Once generated, the dCVV is embedded into the payment data transmitted from the payment device to the point of sale terminal. The data received by the point of sale terminal will appear to the point of sale terminal as standard payment data. In other words, the point of sale terminal will not be able to determine if a dCVV is embedded and where such dCVV may be located. There is no indication to the point of sale terminal that a dCVV is embedded into the data received from the payment device.

Figure 4:
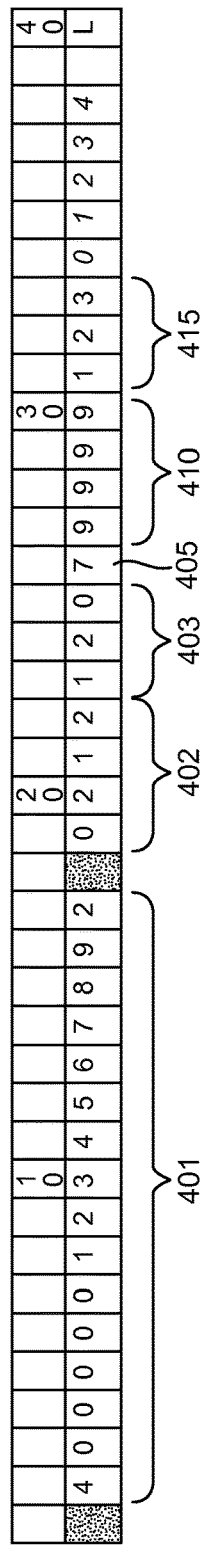
FIG. 4 depicts an exemplary record format for use in an embodiment of the present invention.

FIG. 4 depicts an exemplary record format for transmitting payment data, with the dCVV embedded therein, from the payment device to the point of sale terminal. The record format of FIG. 4 is created by concatenating a primary account number 401 for the payment service, with an expiration date 402, and a service code 403. In a preferred embodiment, the primary account number 401 is 16 digits long, the expiration date 402 is four digits long, and the service code 403 is three digits long. However, the primary account number 401, the expiration date 402, and the service code 403 are not limited to being these lengths. Next, in a field typically reserved for other uses, a value is placed as an indicator 405 that a dCVV has been embedded in this record. The value of this indicator is known by the service provider which deployed the application on the payment device. Next, the ATC 410 is placed in the field which may typically be reserved for PIN verification data. Finally, the dCVV 415 is concatenated on the right of the record. The remainder of the record may comprise additional discretionary data.

Figure 5:
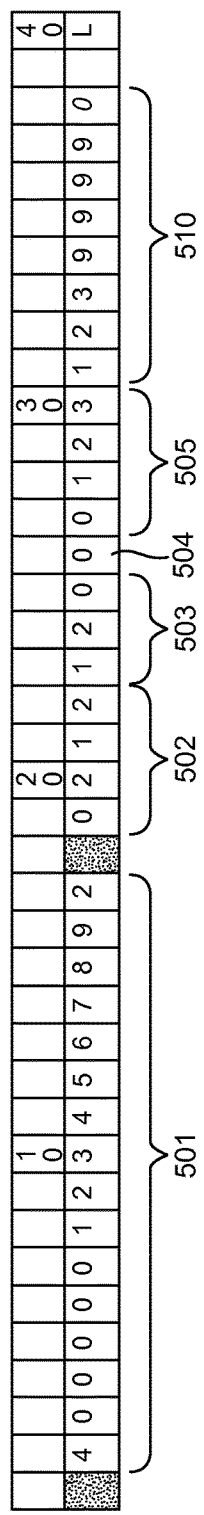
FIG. 5 depicts an alternative exemplary format for use in an embodiment of the present invention.

Alternately, FIG. 5 depicts a second exemplary format for transmitting payment information with the dCVV embedded thereon from the payment device to the point of sale terminal. The format in FIG. 5 is created by concatenating a primary account number 501 for the payment service, with an expiration date 502, a service code 503, a PVKI 504, and a field for PIN verification data 505. In a preferred embodiment, the primary account number 501 is sixteen digits long, the expiration date 502 is four digits long, the service code 503 is three digits long, the PVKI 504 is one digit long, and the PIN verification data 505 is four digits long. However, the primary account number 501, the expiration date 502, the service code 503, the PVKI 504, and the PIN verification data 505 are not limited to being these lengths. Next, in a single data field 510 each of the dynamically created CVV, the ATC and the indicator to be used by the service provider to identify that a dynamic CVV has been embedded are stored in sequence. The remainder of the record may comprise additional discretionary data.

Figure 6:
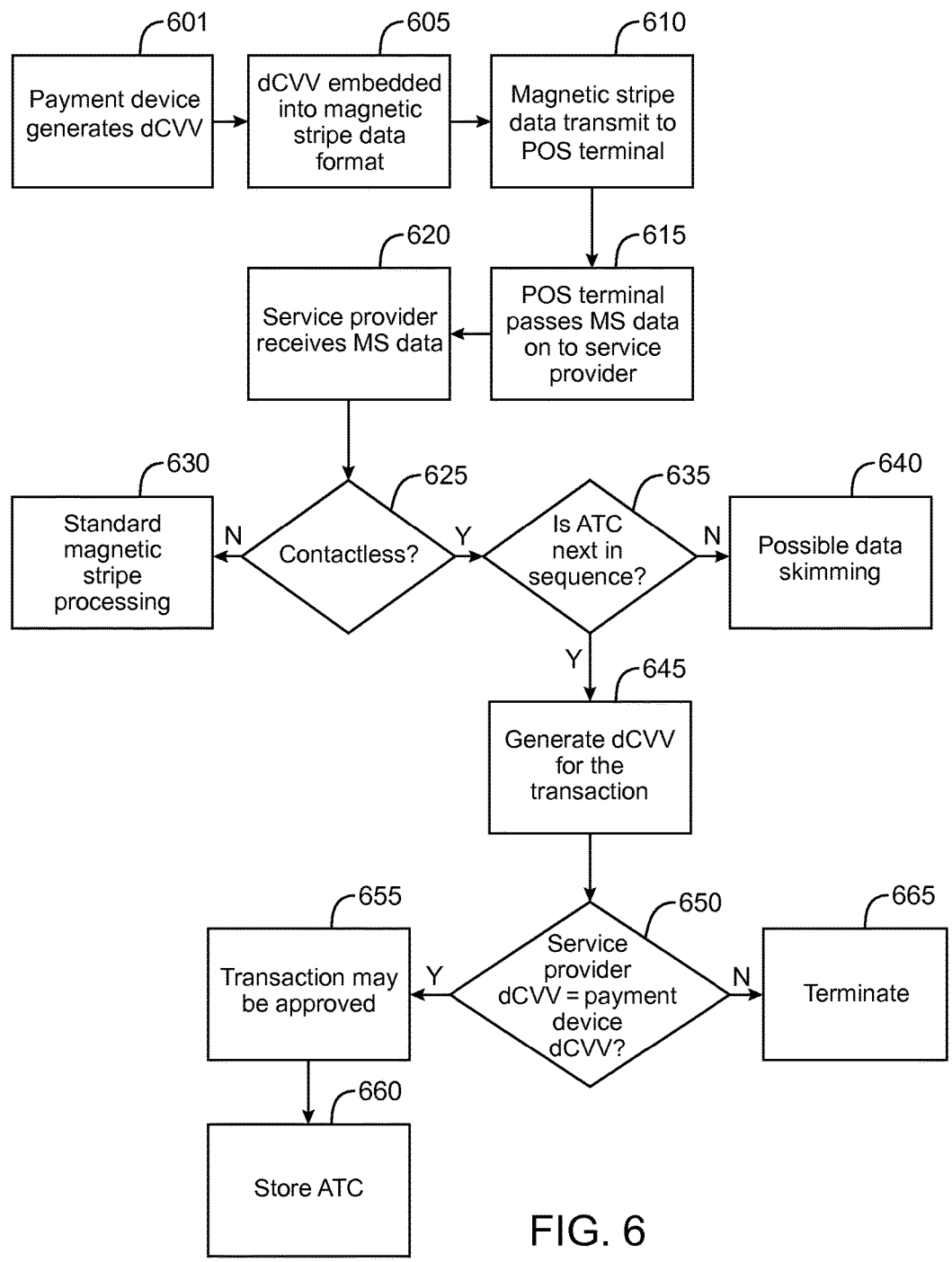
FIG. 6 is a flowchart of a preferred method of utilizing a dynamically created verification value to authenticate a transaction.
Figure 7:
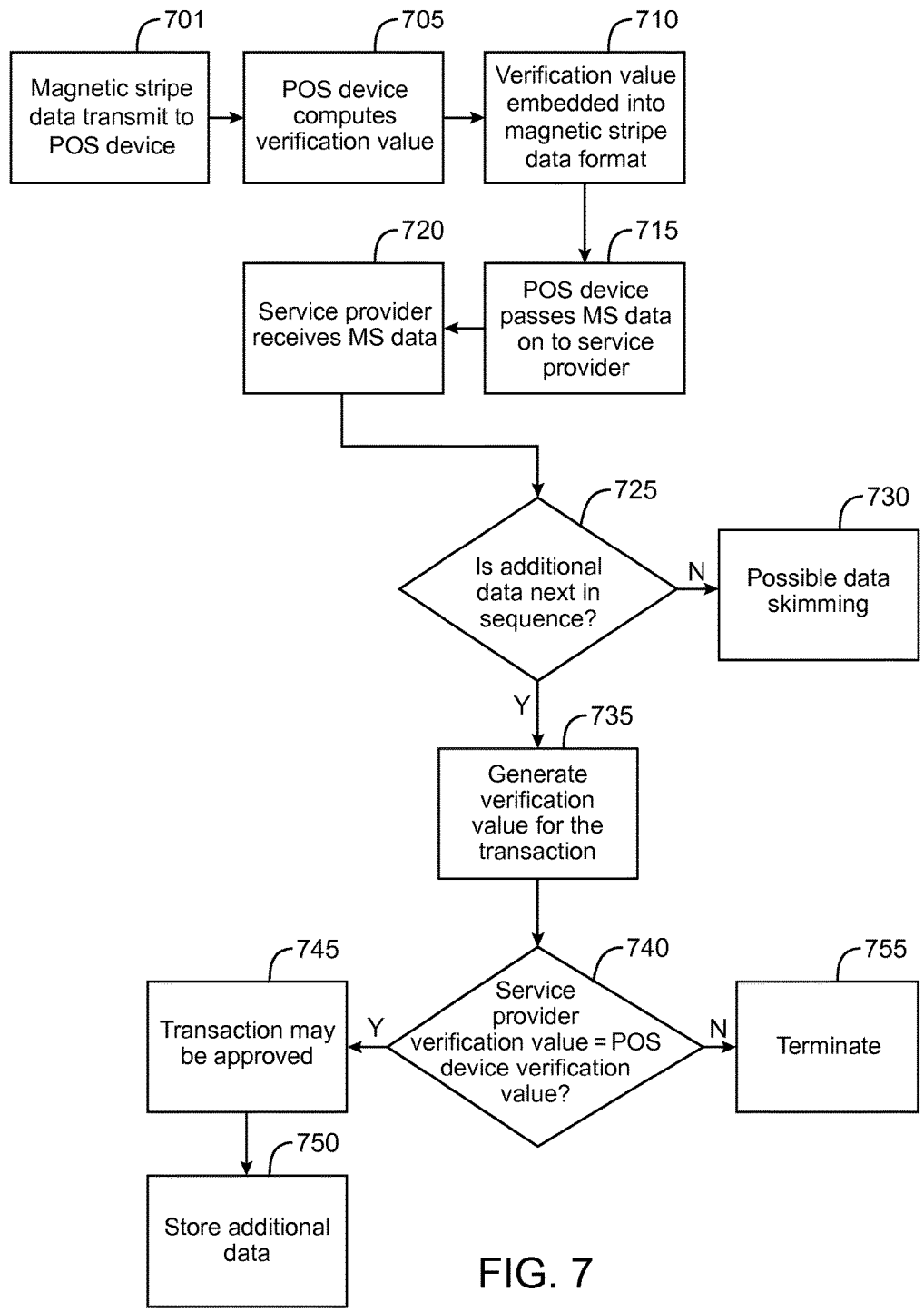
FIG. 7 is a flowchart of an alternate method of utilizing a dynamically created verification value to authenticate a transaction.

An important aspect of the present invention is that the system of utilizing the dynamically created CVV allows the service provider to make a determination of the authenticity of the payment service being utilized. This authentication step is not left to merchants, individual point of sale terminals, or other third parties or devices. FIG. 6 shows how the dCVV is used in a contactless environment to permit the service provider to evaluate the authenticity of the payment application deployed on the payment device to make a determination of whether the payment application has been skimmed. Although shown in the embodiment of a contactless environment in FIG. 6, the present invention is not limited to such an environment and may be used for any transaction where magnetic stripe Track 1 and/or Track 2 data is exchanged using any method or means for communicating such data. As shown in FIG. 6, the payment device generates the dCVV 601, preferably using the methodology described above. The dCVV is embedded into the payment data 605. In this respect, the exemplary record formats shown in FIG. 4 or FIG. 5 may be utilized. The payment data with the embedded dCVV is transmitted by data communication to the point of sale terminal 610. The point of sale terminal recognizes the received data as in the standard format of payment data and passes the data stream on to the service provider computer 615, likely via a payment network (not shown). The service provider computer receives 620 the payment data with the embedded dCVV and interrogates the appropriate indicator to determine if the transaction was a contactless transaction or not 625. If the service provider computer determines that the transaction was not a contactless transaction, the transaction is processed in its normal manner 630. If the service provider computer determines that the transaction was contactless, the service provider computer compares the ATC received from the payment device to the corresponding ATC stored on the service provider computer to determine if the received ATC is the expected next ATC 635. If the ATC received from the payment device is not the expected next ATC, the payment service deployed on the payment device has potentially been skimmed 640. If the expected next ATC is received, the service provider computer will independently re-generate the dCVV for the given transaction 645 utilizing the same process as described above. If the service provider generated dCVV matches the dCVV received from the payment device 650, the service provider deems the payment application to be authentic 655. The service provider computer then replaces the ATC which was previously stored on the service provider computer with the ATC received from the payment device 660 for subsequent authentications. If the service provider generated dCVV does not match the dCVV received from the payment device, the transaction is potentially fraudulent and is terminated 665.

The methodology of FIG. 6 discussed in conjunction with contactless transactions, is not limited thereto. For example, the methodology may be utilized with respect to transactions above a certain threshold value. In such an instance, the service provider, upon deploying the application, would configure the application to generate a dCVV for transactions above the threshold. The indicator interrogated in Step 625 would then be set for transactions above the threshold value. Similarly, the methodology may be utilized with respect to any other transaction criteria including, but not limited to, geographic location, use patterns, or any other criteria.

In an alternate embodiment, the payment device transmits payment data to a point of sale terminal such as a credit card terminal 701. The point of sale terminal receives the data and computes a verification value for the transaction 705. The verification value may be computed in a number of different ways including, without limitation, using a unique transaction number provided by the point of sale terminal, a timestamp, or a transaction amount added to a timestamp. The point of sale terminal may then embed and/or append the verification value and additional data to the payment data 710. The additional data may be required for the service provider computer to verify the transaction. The point of sale terminal then passes the data stream on to the service provider computer 715, likely via a payment network (not shown). The service provider computer receives the payment data with the verification value 720. The service provider computer may optionally compare at least a portion of the additional data embedded or appended by the point of sale terminal to corresponding data stored on the service provider computer to determine if the received data is proper 725. If the received data from the point of sale terminal is improper, the transaction data may potentially have been skimmed 730. If proper data is received, the service provider computer will independently re-generate the verification value for the given transaction utilizing the same process as used by the point of sale terminal 735. If the service provider generated verification value matches the verification value received from the point of sale terminal 740, the service provider deems the payment application to be authentic 745. The service provider computer may then optionally update the additional data which was previously stored on the service provider computer with the additional data received from the payment device for subsequent authentications 750. If the service provider generated verification value does not match the verification value received from the point of sale terminal, the transaction is potentially fraudulent and is terminated 755.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of creating and processing a verification value for a transaction, the method comprising:
   creating, by a microprocessor of a payment device, a base record comprising a data value comprising an account number;
   overlaying, by the microprocessor of the payment device, an application transaction counter (ATC), or hash value based on transaction data for the transaction over a portion of the data value;
   splitting, by the microprocessor, the overlaid data value into at least a first block and a second block;
   encrypting, by the microprocessor, the first block using a first encryption key;
   performing, by the microprocessor, at least an exclusive-OR (XOR) operation on the encrypted first block and the second block to produce a first result;
   encrypting, by the microprocessor, the first result using the first encryption key to produce a second result;
   selecting, by the microprocessor, one or more values based at least in part on the second result as the verification value for the transaction; and
   transmitting, from the payment device through a contact-based or contactless interface to a service provider computer via a POS terminal, the verification value for the transaction, wherein the service provider computer is configured to approve or disapprove of the transaction based on a comparison of the transmitted verification value to a second verification value independently generated from the transaction data at the service provider computer.

2. The method of claim 1 further comprising:
   decrypting the second result using a second encryption key to produce a third result; and
   encrypting the third result using the first encryption key to produce a fourth result,
   wherein the selecting of one or more values is based at least in part on the fourth result.

3. The method of claim 2 further comprising:
   sequentially extracting each value between 0 and 9 from the most-significant digit to the least significant digit of the fourth result to produce a fifth result;
   wherein the selecting of one or more values is based at least in part on the fifth result.

4. The method of claim 3 further comprising:
   sequentially extracting and subtracting hexadecimal A from each value between hexadecimal A and hexadecimal F from the most-significant digit to the least-significant digit of the fourth result to produce a sixth result; and
   concatenating the fifth result and the sixth result to produce a seventh result,
   wherein the selecting of one or more values is from the seventh result.

5. The method of claim 1 wherein the first encryption key is derived from a unique derived key, the unique derived key derived from at least the account number encrypted with a master derivation key.

6. The method of claim 2 wherein the first encryption key and the second encryption key are derived from a unique derived key, the unique derived key derived from at least the account number encrypted with a master derivation key.

7. The method of claim 1 wherein the splitting includes bisecting the data value.

8. A payment device comprising a processor and a computer readable medium coupled to the processor, the computer readable medium comprising code, executable by the processor, for implementing a method comprising:
   creating, by the processor, a base record comprising a data value comprising an account number;
   overlaying an application transaction counter (ATC), or hash value based on transaction data for a transaction over a portion of the data value;
   splitting the overlaid data value into a first block and a second block;
   encrypting the first block using a first encryption key;
   performing an exclusive-OR (XOR) operation on the encrypted first block and the second block to produce a first result;
   encrypting the first result using a second encryption key to produce a second result;
   selecting one or more values based on the second result as a verification value for the transaction; and
   transmitting, from the payment device through a contact-based or contactless interface to a service provider computer via a POS terminal, the verification value of the transaction,
   wherein the service provider computer is configured to approve or disapprove the transaction based on a comparison of the transmitted verification value to a second verification value independently generated from the transaction data at the service provider computer.

9. The device of claim 8 wherein the implemented method further comprises:
   decrypting the second result using a second encryption key to produce a third result; and
   encrypting the third result using the first encryption key to produce a fourth result,
   wherein the selecting of one or more values is based at least in part on the fourth result.

10. The device of claim 9 wherein the implemented method further comprises:
    sequentially extracting each value between 0 and 9 from the most-significant digit to the least significant digit of the fourth result to produce a fifth result;
    wherein the selecting of one or more values is based on at least the fifth result.

11. The device of claim 10 wherein the implemented method further comprises:
    sequentially extracting and subtracting hexadecimal A from each value between hexadecimal A and hexadecimal F from the most-significant digit to the least-significant digit of the fourth result to produce a sixth result; and
    concatenating the fifth result and the sixth result to produce a seventh result,
    wherein the selecting of one or more values is from the seventh result.

12. The device of claim 8 wherein the first encryption key is derived from a unique derived key, the unique derived key derived from at least the account number encrypted with a master derivation key.

13. The device of claim 9 wherein the first encryption key and the second encryption key are derived from a unique derived key, the unique derived key derived from at least the account number encrypted with a master derivation key.

14. The device of claim 8 wherein the splitting includes bisecting the data value.

* * * * *